United States Patent Office 2,928,796
Patented Mar. 15, 1960

2,928,796

POLYMERIC PRODUCT PREPARED BY REACTING MODIFIED VEGETABLE DRYING OILS AND VINYL-CONTAINING MODIFIERS

John S. Heckles, Lancaster Township, Lancaster County, Pa., assignor to Armstrong Cork Company, Lancaster, Pa., a corporation of Pennsylvania No Drawing. Application January 20, 1955
Serial No. 483,173

9 Claims. (Cl. 260—22)

This invention relates to a polymeric product, and more particularly to a polymeric product prepared from drying oils. Still more particularly it relates to a polymeric product prepared by the reaction of certain unsaturated compounds in the presence of a modified drying oil.

It has been known in the past to prepare polymeric products useful as paint vehicles by the reaction of drying oils with vinyl toluene. Generally speaking, the reaction has been carried out by the addition of vinyl toluene to a heated drying oil; an organic peroxide catalyst is used to aid in the polymerization. The product obtained from such a reaction has many uses, chief among which is that of serving as a paint vehicle. Although such products are useful as paint vehicles, they suffer from certain short-comings. Generally speaking, the most serious deficiency noted in the prior product has been that of brittleness. Films prepared from the product do not possess sufficient elongation to serve as a paint vehicle in a wide variety of applications. This has been true even though the tensile strength of such films has been sufficiently high to warrant their adoption to some extent in various paint-making processes. Furthermore, these prior products have suffered to some extent from a lack of alkali resistance.

It is the primary object of the present invention to present a polymeric product which does not suffer from these shortcomings. It is a further object to present a polymeric product from which can be formed a film having increased tensile strength, greatly increased elongation, and increased alkali resistance.

These objects are accomplished in a surprisingly effective manner. A drying oil is heated to a temperature of at least about 200° C. Vinyl toluene is added to the heated oil in an amount between about 15-60% of the total weight of the product while maintaining the temperature of the reaction mixture at least at 200° C. Divinyl benzene in an amount of 1-15% by weight of the total mixture is added either along with the vinyl toluene or subsequent to the vinyl toluene addition. The balance of the mixture may comprise hydrocarbon diluents and an organic peroxide catalyst.

The drying oils used in the present invention may be those drying oils well known to the art, as for example linseed oil, tall oil, soya bean oil, dehydrated castor oil, and other siccative oils. The oils are preferably modified drying oils such as those which have been heat-bodied or alkyd-modified. Preferably a heat-bodied drying oil is utilized. Generally speaking, those heat-bodied drying oils possessing viscosities in the range of B to L are preferred in carrying out the present invention. In a preferred embodiment of the present invention, the heat-bodied drying oil is linseed oil having a viscosity of D in the Gardner Bubble Viscosimeter scale. This viscosity is achieved by maintaining the linseed oil at about 300° C. until the required viscosity is obtained.

In carrying out the present invention, the drying oil is heated to a temperature of at least about 200° C. This is critical. Prior processes have carried out similar reactions at lower temperatures, no higher than about 180° C. It is one of the surprising features of the present invention that the reaction temperature controls to such a large extent the flexibility and elongation of the film prepared from the reaction products. Since one of the reagents, vinyl toluene, boils at a temperature of about 170° C., prior processes have been careful not to go too high above this temperature in order that the amount of vinyl toluene that refluxes may be kept to a minimum.

To the heated heat-bodied or alkyd-modified drying oil are added vinyl toluene, divinyl benzene, and an organic peroxide catalyst, either as a mixture or preferably in the order given. The amount of vinyl toluene to be added should be at least about 15-60% by weight of the total if the film formed from the polymeric product is to possess the requisite properties in regard to tensile strength and elongation. A preferred embodiment of the invention calls for an amount of vinyl toluene of about 25-35% by weight.

In order that the final film will possess the desired elongation, it has been found necessary that divinyl benzene be present as a reactant. The amount of divinyl benzene in the total mixture should be in the range of about 1-15% by weight. It has been found that films formed by reaction products prepared in the absence of divinyl benzene, even at the higher temperatures called for by the present invention, do not possess the elongation of those films prepared in the presence of divinyl benzene. The reason for this is not known. It is postulated, however, that the occasional divinyl benzene molecule occurring in the polymer chain exerts sufficient effect upon the final product to give the desired flexibility.

The organic peroxide catalysts called for by the present invention are those catalysts known to the art. Exemplary of such catalysts are ditertiary butyl peroxide, 2,2 bis (tertiary butyl peroxy) butane, tertiary butyl perbenzoate, dicumyl peroxide, and ditertiary butyl diperphthalate. As a general rule, the catalysts may be added in an amount equivalent to about 0.1–2.0% by weight of the total weight of the reaction mixture, and preferably in an amount of about 0.2–0.6%. The catalysts should preferably be added along with the vinyl toluene.

The process of carrying out the reaction of the present invention is straightforward. The modified drying oil is simply heated in any convenient vessel to the requisite 200° C. and the vinyl toluene, divinyl benzene, and catalysts are slowly added thereto. The addition should be carried out slowly in order to minimize the amount of vinyl toluene and divinyl benzene volatilized and thus withdrawn from the sphere of reaction. It is generally advisable to have a reflux condenser available in order to return the small amount of added constituents which will reflux even when the addition is carried out slowly.

The amount of drying oil to be used will vary between about 25% and about 84% by weight of the total reaction mixture.

Once the vinyl toluene, divinyl benzene, and organic catalyst have been added to the oil, it is preferred to maintain the reaction mixture at least at the reaction temperature of 200° C. for a further period of time to complete the reaction, usually 1 to 4 hours. Pressure can be used if desired. It has been found that this procedure adds some further degree of flexibility to the film formed from the reaction product.

At the completion of the reaction, the mixture may be cooled, thinned with mineral spirits, and utilized as a paint vehicle. In testing the properties of the vehicle, a film of the vehicle may be formed in known manner and subjected to various known tests to determine its properties.

The following table shows the effect of increasing temperature under otherwise identical conditions on the properties of the resulting film. A heat-bodied linseed oil of the noted viscosity was used as the drying oil.

TABLE

| Temperature, Degrees C. | Percent Oil of Total | Viscosity of Oil | Percent Vinyl Toluene | Percent Divinyl Benzene | Tensile Strength, Lbs./Sq. In. | Elongation, Percent |
| --- | --- | --- | --- | --- | --- | --- |
| 180 | 60 | D | 30 | 10 | 75 | 40 |
| 220 | 60 | D | 30 | 10 | 100 | 90 |
| 240 | 60 | D | 30 | 10 | 91 | 105 |

The great increase in elongation resulting from carrying out the reaction at 220° or higher as opposed to carrying out the reaction at 180° C. or lower is apparent from the table. As the temperature of reaction is increased from 180° C., it is accompanied by a gradual increase in the elongation of the resulting film. At about 200° C., the increase in elongation becomes significant.

The invention as outlined above produces a film having highly desirable characteristics. The critical elevated reaction temperature appears to produce the new polymeric materials of the present invention. As has been mentioned, these materials are useful in the paint-making art. Should it be necessary or desirable to increase the elongation of the film still further, such may be done by the addition of certain acrylic compounds along with the vinyl toluene and the divinyl benzene. Exemplary of these acrylic compounds are acrylonitrile, methyl acrylate, ethyl acrylate, normal butyl acrylate, and the corresponding methacrylates. When such compounds are added to the reaction mixture in an amount ranging from about 5–20% and preferably from about 5–10% by weight on a total weight basis, a further increase in elongation can be noted. When an acrylic compound is used, it replaces the vinyl toluene on a weight basis. Thus, if 8% by weight of an acrylic compound is to be used, the amount of vinyl toluene will be decreased by 8%, with the proviso that the minimum amount of 15% vinyl toluene always be maintained.

For example, a formulation containing 60% linseed oil of viscosity E, 25% vinyl toluene, 10% divinyl benzene, and 5% butyl acrylate, and prepared according to the procedures described above at 200° C., produces a film having a tensile strength of 78 pounds per square inch and a percentage elongation of 135.

Paints may be formulated from the reaction products of the present invention by means well known in the art. Useful paints possessing highly desirable properties are readily prepared by the proper blending of fillers, thinning oils, driers, and the reaction product of the present invention. For example, an excellent paint may be prepared containing 44 parts by weight pigment and filler, 12 parts by weight No. 18 oil (long oil varnish and linseed oil plus phenolic resin), and 24 parts by weight of the product of the present invention. The pigments and fillers may be those materials well-known in the art, for example, $TiO_2$, zinc oxide, lithopone, clay, whiting, blanc fixe, mixtures thereof, and other ingredients. Although the reaction products of the present invention are particularly directed at paint vehicles, it is, of course, not necessary that they be utilized as such. Wherever a tough, flexible, water- and alkali-resistant film is useful, the reaction products disclosed herein will serve. Additionally, the reaction products of the present invention serve as oxidizing oils in the manufacture of linoleum cement.

The following examples illustrate specific embodiments of the invention. All parts are by weight unless otherwise noted.

Example I

Into a 3-neck flask equipped with an agitator, reflux condenser, and thermometer, there was placed 260 parts linseed oil of viscosity D on the Gardner Bubble Viscosimeter scale. The oil was heated to a temperature of 220° C. To the heated oil was added a mixture of 100 parts vinyl toluene, 40.8 divinyl benzene, and 4.0 parts ditertiary butyl peroxide. The mixture was added over a period of 1 hour. At the end of the addition, the reaction mass was maintained at 220° C. for an additional 3 hours, after which time it was cooled, thinned with mineral spirits, and formed into a film. The film was tough and possessed unusual flexibility.

Example II

To a charge of 495 parts by weight D linseed oil maintained at a temperature of 200° C. there was added a mixture containing 243 parts by weight vinyl toluene, 72 parts by weight butyl acrylate, 90.8 parts by weight divinyl benzene, and 11.2 parts by weight ditertiary butyl peroxide. The addition required 1 hour and 15 minutes. At the end of the addition, the temperature was maintained at 200° C. for 3 hours and was then allowed to fall to room temperature, at which point the reaction products were diluted with mineral spirits and formed into a film. The film had unusual properties of both tensile strength and flexibility.

Example III

A charge of 540 parts by weight D linseed oil was maintained at a temperature of 220° C. while there was slowly added thereto a mixture of 270 parts by weight vinyl toluene and 8.1 parts by weight ditertiary butyl peroxide; the addition required 1 hour. There was then added all at once 90 parts by weight divinyl benzene and 2.7 parts by weight ditertiary butyl peroxide, and the reaction mixture was maintained at 220° C. for 3 hours.

The cooled reaction mixture was diluted with mineral spirits and formed into a film having a tensile strength of 100 pounds per square inch and an elongation of 90%.

Example IV

A charge of 446 parts by weight tall oil fatty acids (containing 4% rosin acids), 87 parts by weight pentaerythritol, and 55 parts by weight phthalic anhydride was heated at 200° C. for 6 hours until an acid number of about 10 was obtained; water was removed during heating. The temperature was then raised to 220° C., and there was added over a period of 1½ hours a mixture of 223 parts by weight vinyl toluene and 4.5 parts by weight dicumyl peroxide. There was then added a mixture of 75 parts by weight divinyl benzene and 1.5 parts by weight dicumyl peroxide, after which the temperature was maintained at 220° C. for 1 hour and at 240° C. for 1 hour.

The cooled reaction mixture was thinned with mineral spirits and formed into a tough film having excellent elongation.

I claim:

1. The process of preparing a polymeric product consisting essentially of a modified vegetable drying oil, divinyl benzene, and a reactant selected from the group consisting of vinyl toluene, a mixture of vinyl toluene and acrylonitrile, and a mixture of vinyl toluene and an acrylate ester having 1–4 carbon atoms in the ester group, which process comprises heating a modified vegetable drying oil selected from the group consisting of heat-bodied drying oils having a viscosity in the range of B to L on the Gardner Bubble Viscosimeter scale and an alkyd-modified drying oil prepared by the reaction of tall oil fatty acids, pentaerythritol, and phthalic anhydride to a temperature of at least about 200° C. and adding thereto said reactant and divinyl benzene in amounts of about 15–60% and 1–15%, respectively, of the total weight of the reaction product in the presence of an organic peroxide catalyst while maintaining the reaction mixture at said temperature of at least about 200° C.

2. The process according to claim 1 wherein said temperature lies in the range of about 220°–240° C.

3. The process according to claim 1 wherein said modified drying oil is heat-bodied linseed oil.

4. The process according to claim 1 wherein said modified drying oil is said alkyd-modified drying oil.

5. The process of preparing a polymeric product consisting essentially of heat-bodied linseed oil, vinyl toluene, and divinyl benzene, which comprises heating a heat-bodied linseed oil having a viscosity in the range of B to L on the Gardner Bubble Viscosimeter scale to a temperature in the range of about 200°–240° C., adding 15–60% by weight vinyl toluene based on the total weight of the reaction product, 1–15% by weight divinyl benzene based on the total weight of the reaction product, and an organic peroxide catalyst thereto, and maintaining the reaction mixture at a temperature of about 200°–240° C. for a period of from about 1 to about 3 hours.

6. The process of preparing a polymeric product consisting essentially of a modified vegetable drying oil, vinyl toluene, and divinyl benzene, which comprises reacting a modified vegetable drying oil selected from the group consisting of heat-bodied drying oils having a viscosity in the range of B to L in the Gardner Bubble viscosimeter scale and an alkyd-modified drying oil prepared by the reaction of tall oil fatty acids, pentaerythritol, and phthalic anhydride, maintained at a temperature greater than about 200° C., with 15–60% by weight vinyl toluene and 1–15% by weight divinyl benzene, said weights being based on the total weight of the reaction product, in the presence of an organic peroxide catalyst.

7. A polymeric product consisting essentially of modified vegetable drying oil, divinyl benzene, and a reactant selected from the group consisting of vinyl toluene, a mixture of vinyl toluene and acrylonitrile, and a mixture of vinyl toluene and an acrylate ester having 1–4 carbon atoms in the ester group, prepared by maintaining a modified vegetable drying oil selected from the group consisting of heat-bodied drying oils having a viscosity in the range of B to L on the Gardner Bubble viscosimeter scale and an alkyd-modified drying oil prepared by the reaction of tall oil fatty acids, pentaerythritol, and phthalic anhydride, at a temperature of at least about 200° C., and adding thereto said reactant and divinyl benzene in amounts of about 15–60% and 1–15%, respectively, of the total weight of the reaction product, in the presence of an organic peroxide catalyst.

8. The product according to claim 7 wherein said modified vegetable drying oil is heat-bodied linseed oil.

9. A polymeric product consisting essentially of modified vegetable drying oil, vinyl toluene, divinyl benzene, and an acrylic compound prepared by maintaining a modified vegetable drying oil selected from the group consisting of heat-bodied drying oils having a viscosity in the range of B to L on the Gardner Bubble Viscosimeter scale and an alkyd-modified drying oil prepared by the reaction of tall oil fatty acids, pentaerythritol, and phthalic anhydride, at a temperature of at least about 200° C. and adding thereto vinyl toluene, divinyl benzene, and said acrylic compound selected from the group consisting of acrylonitrile and acrylate esters having 1–4 carbon atoms in the ester group, in amounts of about 15–60%, 1–15%, and 5–20%, respectively, of the total weight of the reaction product in the presence of an organic peroxide catalyst, wherein the weight of the acrylic compound replaces the weight of the vinyl toluene while maintaining the minimum weight of the vinyl toluene at 15%.

References Cited in the file of this patent

UNITED STATES PATENTS 2,650,907     Sample _____ Sept. 1, 1953

OTHER REFERENCES

Vermorken: Chimie Peintures, August 1954, pp. 237–45.

Hansen: Paint Oil and Chem. Review, Dec. 31, 1953, pages 11–13.

Ind. and Eng. Chem., vol. 46, 1954, pages 1695–1700.